Sept. 27, 1960 A. F. LARSON 2,953,983
PHOTOGRAPHIC SHUTTER
Filed Jan. 23, 1958 7 Sheets-Sheet 3

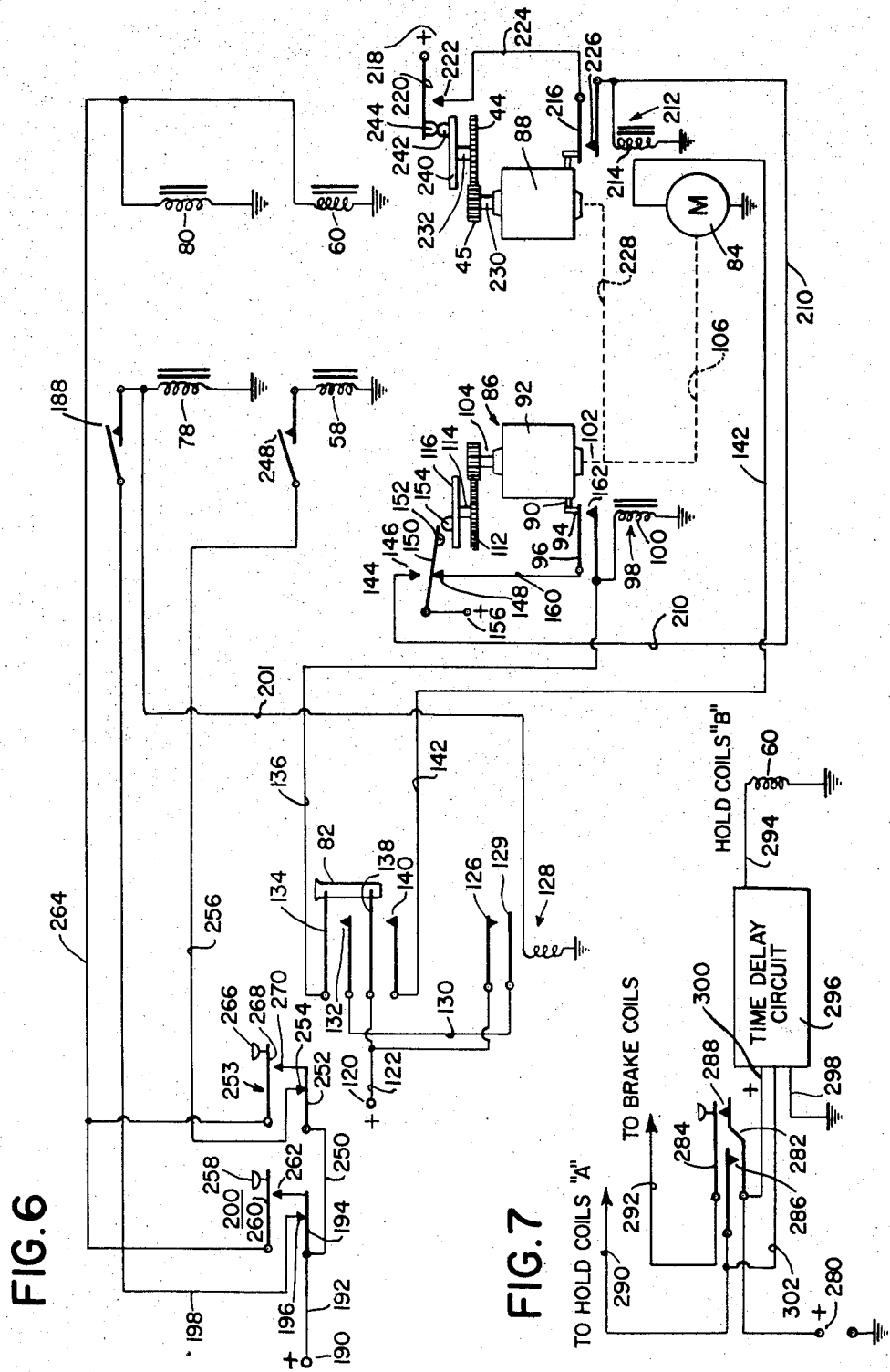

United States Patent Office 2,953,983
Patented Sept. 27, 1960

2,953,983

PHOTOGRAPHIC SHUTTER

Alfred F. Larson, Halesite, N.Y., assignor to Systems Associates, Inc., Huntington Station, N.Y., a corporation of New York Filed Jan. 23, 1958, Ser. No. 710,698

19 Claims. (Cl. 95—63)

This invention relates to photographic shutters.

It is particularly applicable to shutters of the type used with long focal length lenses with wide apertures, such as those used, for example, in aerial cameras.

In one of its forms, the invention is applicable to a shutter mechanism of the type using two exposure control leaf or blade systems, actuated sequentially. First, one leaf system uncovers the lens aperture; then, after the appropriate exposure interval, the other leaf system closes the lens aperture.

The first of these systems, for example, the one located toward the front of the camera, may conveniently be referred to as the A leaf or blade system, and the second as the B system.

One problem of shutters heretofore existing is that they are complicated mechanisms, and to work properly, the various parts must be very accurately dimensioned, with tight tolerances. Because of the necessary tight tolerances, the adjustment of the shutter is difficult and time-consuming. The adjustment should be such that the parts neither bind nor operate loosely, because looseness seems to be a main cause for destruction of or damage to the various parts, by the impact shocks which occur when the shutter is operated. That is, very high forces have been required to produce fast action of the shutter, but these high forces have produced high impact shocks, which are accentuated by looseness in the parts of the shutter.

The violent impact shocks existing in shutters heretofore not only produced noise, but produced motion of the camera during exposure and tended dynamically to degrade the photographs.

Despite the need for faster exposure, and despite the desire to improve existing shutters, particularly to speed them up, improvements in the speed of operation have been relatively small for many years.

An object of the present invention is to solve these and related problems by providing a shutter mechanism which is simple in structure, capable of faster operation than existing shutters, quiet, substantially shockless, efficient in operation, easy to assemble with minor adjustment, which does not require close tolerances, can readily use interchangeable parts, and which is less expensive than previous shutters.

The shutter provided by the present invention represents a complete break-through in the art, is a radical departure from previous designs and produces a new and surprising type of operation.

As contrasted with previous shutters, it contains only a small fraction of the number of moving parts which operate for the control of exposure.

The invention is illustrated in an embodiment in which the shutter includes two apertured plates, each carrying a set of spring-actuated leaves or blades. The springs for one set of leaves bias the leaves toward an open position, and the springs for the other set of leaves bias the leaves toward a closed position.

The individual leaves are preferably made of lightweight material, for example, aluminum, to which is attached a small strip of material having magnetic properties, for example, iron or steel. This strip may be referred to as an armature.

Each leaf is individually powered by its own individual spring.

In one embodiment, each leaf is connected to the next leaf by a link, for the purpose of maintaining leaf-to-leaf position control. The forces applied to these links are determined by the difference in the forces applied by the individual springs to the individual leaves directly; that is, this arrangement is in this respect radically different from arrangements in which power from a single central source is applied through links to all the leaves. Because of the individual powering of the leaves in the arrangement proposed, the links do not carry high forces, and they can be of much lighter weight than they would be if the arrangement just referred to were employed.

Although in the past, individual springs for each leaf have been proposed, the latching and stopping arrangement has commonly been of a mechanical type, and this has produced serious problems because of the need for simultaneous releasing of each leaf. If the release were not simultaneous, harmful reactions would occur between the leaf elements, because of the high stress and a general slowing down of the action.

In the arrangement proposed in the present application, on the other hand, a magnetic latching or holding means is employed in combination with individual powering of the leaves. For this, there is provided in the plate, at locations opposed to the armatures carried by the leaves when the leaves are in the latched position, what is here referred to as a magnetic slot, including a magnetic pole piece, energized by an associated electromagnet. Thus, in the A blade system, for example, the leaf system is mechanically closed, and current is applied to the coils of the electromagnets which energize the magnetic latching slots. This causes the armature carried by each leaf to be attracted to the plate by more than sufficient force to hold each leaf in position against the spring tending to pull this leaf open.

An important feature is that this magnetic latch is effective over a large area, and this eliminates the need for close tolerances which would be required if the system were to be latched mechanically.

To trip the leaf system, the circuits supplying current to the coils of the holding electromagnets are opened. This causes the magnets to release the armatures, thereby allowing the springs to move the leaves toward their other position.

The spring system is arranged to preload all the leaves in their pivot bearings, and no backlash or lost motion exists in any part of the moving system.

When the magnetic circuits are open, there is produced an exceptionally smooth but fast simultaneous acceleration of each leaf to high speed, without shock or noises.

To brake the leaves to a complete, fast stop, simultaneously and without interaction of all the leaves in the system, there is provided a novel magnetic braking system. The armatures carried by each leaf encounter a second area of high magnetic flux just prior to the point where the leaves reach their desired end positions. The magnetic action forces the armature against the base plate, and produces a very high frictional force which brakes the motion of the leaf. This results in a very fast stopping of all the leaves in the desired position without the application of high stress to any part of any leaf or other link system. The distribution of the braking over a wide area, and the individual braking of the leaves, provides a gentle but positive braking. This is far superior to a central braking arrangement, the effect of which must be transmitted through links to the leaves.

The shutter of the present application provides many very important advantages, a number of which will be discussed at subsequent points in the description.

In addition, there is also described in this application a novel system, including circuits, for controlling and actuating, in proper timed relation, the latching, releasing and braking of the two sets of leaves.

Further objects, features, advantages and embodiments of the invention will appear from the more detailed description set forth by way of illustration, which will now be given in conjunction with the accompanying drawings, in which:

Fig. 1 is a longitudinal sectional side view through the shutter, including an A leaf system toward the front of the camera (in the upper part of the figure), and a B leaf system (in the lower part of the figure). Certain parts are broken away for clarity, Fig. 2 is a view of the B leaf system in closed, tripped position, as seen from a position between the two sets of leaves. The point of view of Fig. 2 is indicated at 2—2 in Fig. 1, Fig. 2A is an enlarged sectional view through a braking slot in the supporting plate for the B leaf system, the sectional plane being shown at 2a—2a in Fig. 2, Fig. 3 is a view of the B leaf system, as seen from the rear, as indicated at 3—3 in Fig. 1, in closed, tripped position, Fig. 4 is a view of the B leaf system, in open, reset position, as seen from the same viewpoint as that of Fig. 2, Fig. 5 is a view of the A leaf system, in open, tripped position, as seen from the point of view indicated at 5—5 in Fig. 1, Fig. 6 is a schematic diagram showing circuits and other components for controlling the resetting, tripping and braking of the two sets of leaves;

Fig. 7 is a schematic circuit diagram used in explaining how a single manual control can actuate and control, in proper timed relation, the tripping and braking of the two sets of leaves;

Figure 1:
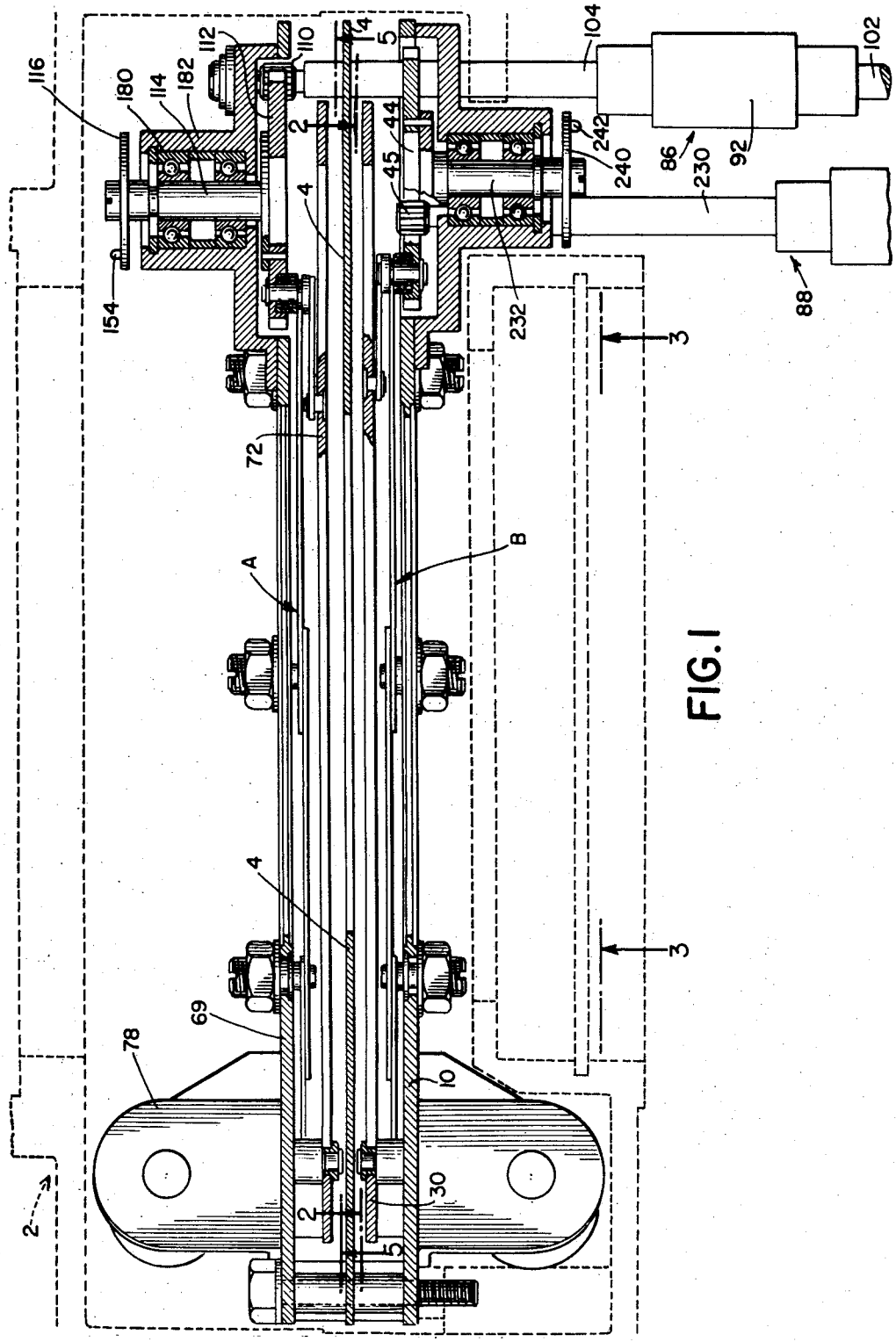

In the description of the embodiment illustrated in the drawings, the rear or B set of leaves, and associated components, will be described first, then the A set. Thereafter, there will be described the apparatus for resetting and releasing the two sets of leaves.

Both sets of leaves appear in Fig. 1, within a housing 2, schematically represented in broken lines. The front of the camera is toward the top of this figure. Consequently, the A set of leaves is the top set, and the B set is the lower set, in this figure. Interposed between the two sets of leaves is an apertured plate 4.

The B set of leaves

Figure 2:
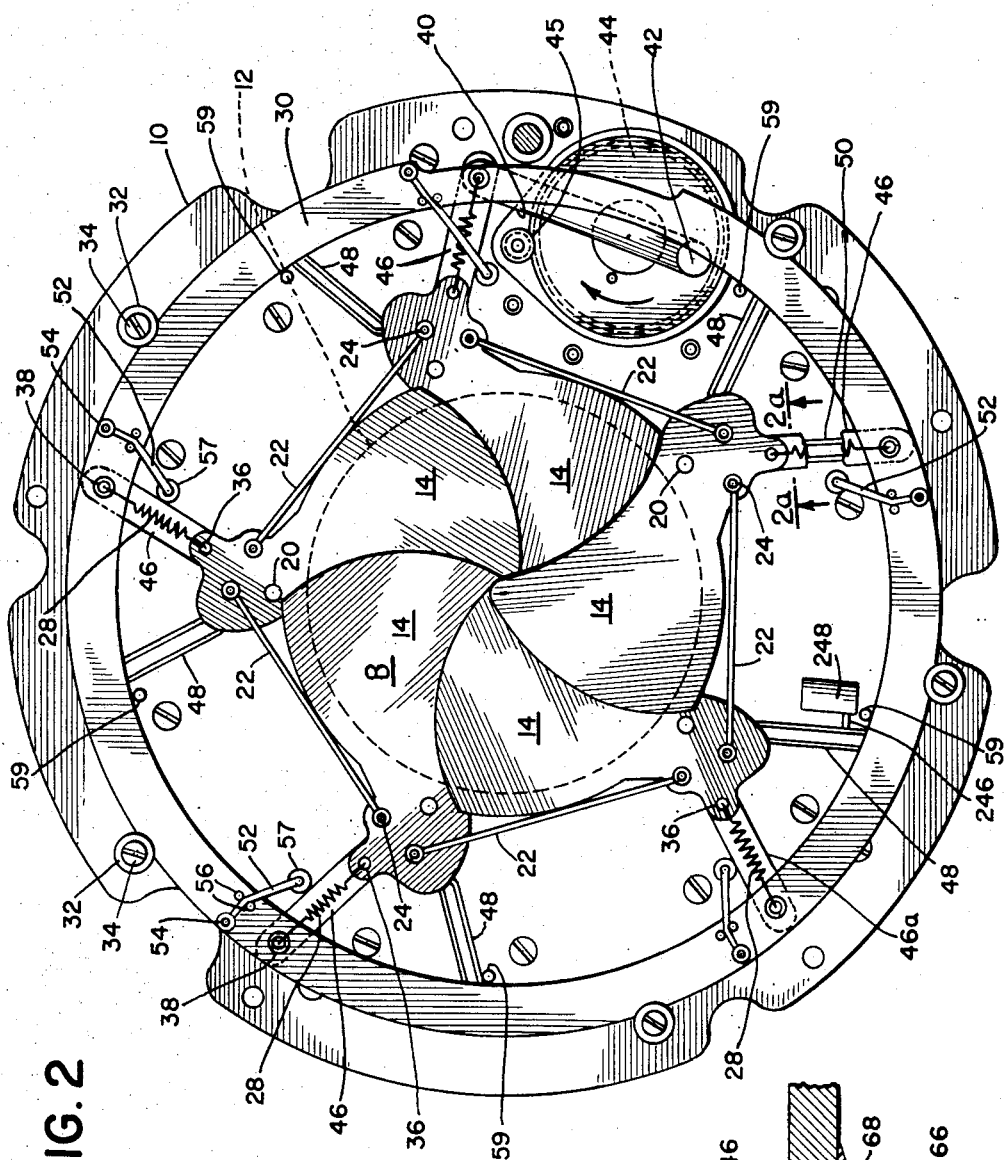
Figure 4:
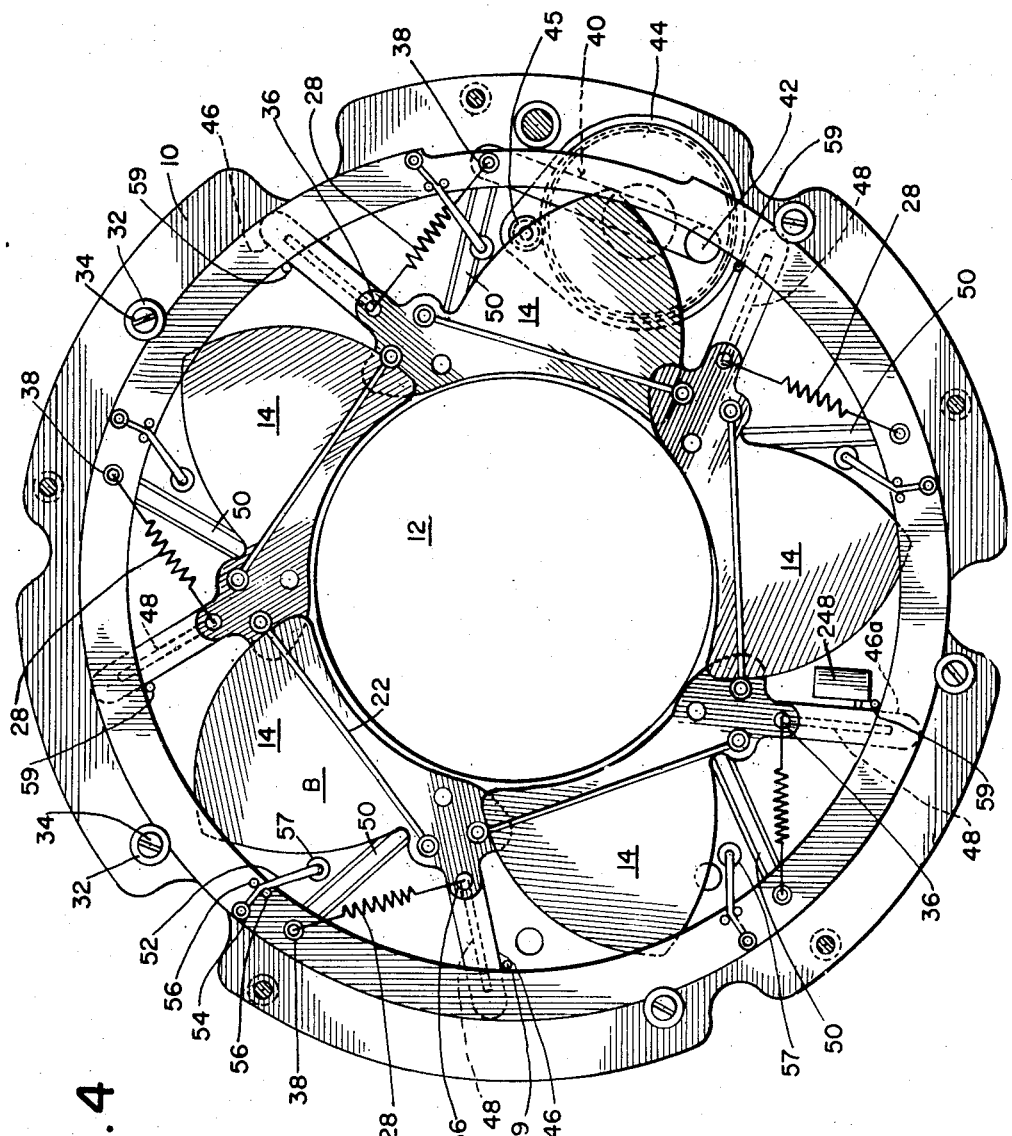

As seen in Fig. 2, there is provided a base plate 10, of magnetic material, for example, steel, including an aperture 12, and five leaves 14, movable to an open position, as shown in Fig. 4, and to a closed position, as shown in Fig. 2. When in the closed position, the leaves overlap with one another so as to close the aperture. The main body portion of these leaves is of lightweight material, for example, aluminum. This main body portion thus need not be of magnetic material. On the other hand, it may in some embodiments be of magnetic material, for example, thin steel.

The leaves 14 include bearings and are mounted for pivotal motion on pivots affixed to the plate 10. Each of these pivots terminates in an enlarged portion 20, for retaining the leaves.

Coupling each of the leaves to the next one, there are provided links 22 rotatably affixed at their ends to the leaves, by pins 24 shaped to receive the links and having enlarged heads.

The leaves are individually powered. That is, there is provided, for each individual leaf, a spring 28, arranged in this B set of leaves, to urge the leaf toward its closed position.

Carried on the base plate 10, and arranged so that it may rotate a limited distance, there is provided a ring 30, guided by ring bearings 32, which are rotatably mounted on pivots 34.

One end of each of the springs 28 is attached to its leaf at a pin 36. The other end is attached to the ring 30 at a pin 38.

The position of the ring 30 shown in Fig. 2 is its normal position. For resetting the set of leaves, means are provided for shifting the ring 30 in a counterclockwise direction. For this purpose, pivotally attached to the ring at one end there is provided a reset link 40. The other end of this link is pivotally carried on a crank pin 42 which comprises a projection on a gear 44. The gear 44 in turn is driven by a reset pinion gear 45.

Affixed to each of the leaves, as an extension projecting outwardly, is an armature 46, of magnetic material, for example, steel.

To cooperate with each of the five armatures 46, there are provided in the base plate 10, latching magnetic slots 48, one for each of the leaves, positioned so that the armature 46 will be opposed to its slot 48 when the leaf is in its open position, as shown in Fig. 4. There are also provided a set of braking magnetic slots 50, one for each leaf, positioned so that the armature will be opposed to its slot 50 when the leaf is in its closed position. The details of the construction of the magnetic slots, and their associated components, and the means for energizing and de-energizing them will be described in detail at a subsequent point.

To reset the leaves, the reset pinion 45 is rotated in a counterclockwise direction, which then rotates the gear 44 in a clockwise direction. As the gear 44 rotates through 180 degrees from approximately the starting point shown in Fig. 2, it acts through the link 40 to shift the ring 30 in a counterclockwise direction. In order that this motion of the ring may move the leaves to the open position, there are carried on the ring a set of arms 52, one associated with each of the armatures 46. These arms 52 are of firm but resilient material, such as a strip of steel, adapted to be resilient against bending. One end of each arm 52 is attached to the ring 30 at a pin 54. There are also provided on the ring pins 56 located on either side of the arms 52 for bracing them. The arms each carry a small cylinder or button 57 on their inner end, for pushing against the opposed armature 46 when resetting the leaves. When the ring is moved in a counterclockwise direction, the arms 52, acting through these cylinders 57, push the leaves open (counterclockwise) to the latched position. That is, each leaf of the B set of leaves will be thus pushed open to a position where its armature 46 is opposite its latching magnetic slot 48.

More particularly, the arms 52 push the armatures 46 counterclockwise until this motion of the armatures is checked by stop pins 59. These stop pins are carried on the plate 10 at such positions that when the armatures 46 are pressed against them, the armatures will lie over the latching magnetic slots 48. The arms 52 being of firm but resilient material, the ring 30 provides sufficient overtravel to make certain that all the armatures definitely are brought to the correct latched position, over the latching magnetic slots.

Because the latching and braking forces are applied through the armatures to the leaves, it is important that the armatures be firmly secured to the leaves. In one arrangement, each armature is riveted to its leaf at four points. For example, these points may be in the regions near the pin 36, the pins 24, and surrounding the pivot 20.

The magnetic slots 48 then are energized, by means yet to be described, and act to hold their associated armatures 46 and the leaves 14 in the open, latched position.

In one embodiment, the energizing of the latching magnetic slots 48 is accomplished with the aid of a switch 248, a portion of which is in position to be engaged by one of the armatures when it has reached the latched position, as may be seen in Fig. 4.

While the magnetic slots 48 are thus holding the leaves in the open position, the pinion 45 is rotated farther, thereby rotating the gear 44 approximately another 180 degrees, so as to return that gear and the ring 30 to approximately the normal position of these elements. The elements are now in the position shown in Fig. 4. Because of the relative position of the spring 28, as defined by its two end points at 36 and 38, with respect to the pivot 20 on which the leaves rotate, it may be seen that the spring 28, under tension, applies a torque to the leaves 14 in a clockwise direction, so as to urge them toward the closed position.

It will be understood from the previous description that the general function of the B set of blades is to terminate the exposure by closing the aperture quickly at the end of the required time. Thus whenever the magnetic latching slots 48 are simultaneously de-energized, each of the springs 28, acting directly on its own associated leaf 14, quickly rotates that leaf to the closed position.

In this connection, it may be noted that there is no backlash in the system prior to the moment when the leaves begin to close, because the action of the springs 28 prestresses each individual leaf with a closing torque.

As shown in Fig. 2, the links 22 are not the primary source of power for individual leaves; on the contrary, the power is applied directly by the springs 28. The forces in the links 22 are second-order effects, produced by any tendency toward minor differences in the closing motion of the leaves. These links 22, because they do not carry high forces, may be of much lighter material than would be required if they transmitted primary power to the leaves. The links 22 serve to aid in maintaining the leaves at their proper relative position to one another. They may, however, in some embodiments of the invention, be eliminated. In embodiments in which they are eliminated, the only parts of the apparatus which move, when the leaves are moving from their latched to their tripped position, are the leaves, including their armature portions, and the springs.

*The magnetic slots*

Figure 2A:
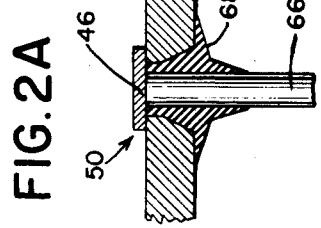
Figure 3:
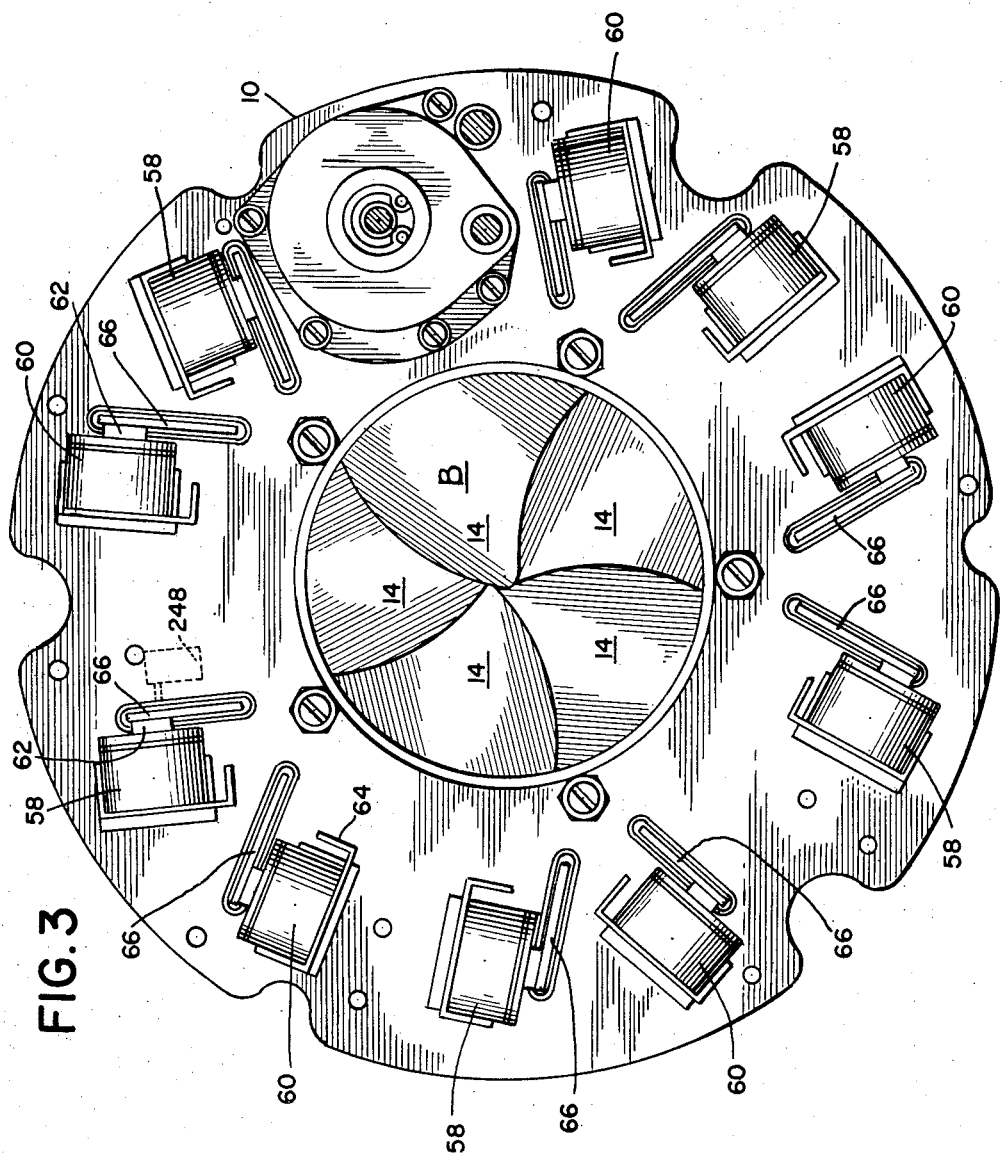

Referring to Fig. 3, it may be seen that there are provided, in this illustrative embodiment, ten electromagnets on the side of the base plate opposite the side on which the leaves are located. Five of these magnets 58, connected in parallel, are latching or holding magnets, associated respectively with the latching magnetic slots 48. The other five magnets 60, connected in parallel, are braking magnets, associated with the braking magnetic slots 50. (For simplicity, most of the magnets are omitted in Fig. 1.) Each of the magnets comprises a coil through which an electric current is supplied when it is to be energized. Extending through the coil is a core or pole piece 62. Each of the magnets is attached to the plate 10 by a bracket 64. Connected to the member 62 and extending into the adjacent slot is a pole piece 66. The members 62, 64 and 66 are of magnetic material. Details of a typical slot, and an associated armature 46, are shown in Fig. 2A. (Although the slot is in this figure a braking slot, the construction is generally the same as for a latching slot. At a later point there will be pointed out certain advantageous constructional features peculiarly applicables to the braking slots.) The end of the member 66, which is sometimes referred to as a magnetic clutch pole piece, terminates in a region substantially flush with the surface of the base plate 10, on the side on which the leaves are located. The width of the slot is somewhat wider than the width of the member 66, so as to provide a gap in the magnetic path. This gap is, however, filled with an epoxy-resin or other non-magnetic material 68. The base plate is cut away in the region of the slot on its side opposite that on which the leaves are located in order to provide a high reluctance path in this region, thereby forcing the magnetic flux to pass across the gap in a region closer to the leaves. The epoxy-resin prevents stray particles, particularly partiles of magnetic metallic material, from entering the slot, and also gives the system added mechanical strength.

It will be understood that the pole piece 62, the members 64 and 66, and the base plate 10 provide a magnetic flux path of relatively low reluctance, except in the region of the resin-filled gap shown in Fig. 2A. When the magnet 58 is energized, and when the magnetic armature 46 is covering the slot, the preferred path for the flux will pass through the armature 46. The magnet pulls the armature firmly against the plate.

In the case of the latching slots, the action is that the friction between the armature and the plate is great enough so that when this magnet is energized, the springs are unable to shift the leaves from the latched position to the released position.

In operation, the braking magnetic slots are energized before the latching magnetic slots are de-energized. Once the latter are de-energized, the springs very quickly shift the leaves toward the released position. When the armatures 46 approach the energized braking magnetic slots 50, these armatures will enter a region of high magnetic flux, which will attract the armatures against the plate, producing friction. This friction, together with the magnetic field, brings the leaves firmly to a stop at the desired position where the leaves have closed the aperture, and the armatures 46 are opposed to the braking slot as illustrated in Fig. 2A.

*The A set of leaves*

The B or rear set of leaves having been described above, the A set or front set of leaves will now be described, in connection with Fig. 5.

In general, this set of leaves and its associated mechanism is the same as for the B set of leaves, except that the A set of leaves is closed when in the latched position, and the leaves are spring-biased so that, when released, they fly open. They are shown in the released, open position in Fig. 5. Magnetic latching and braking is employed, as has been described for the B set of leaves.

Figure 5:
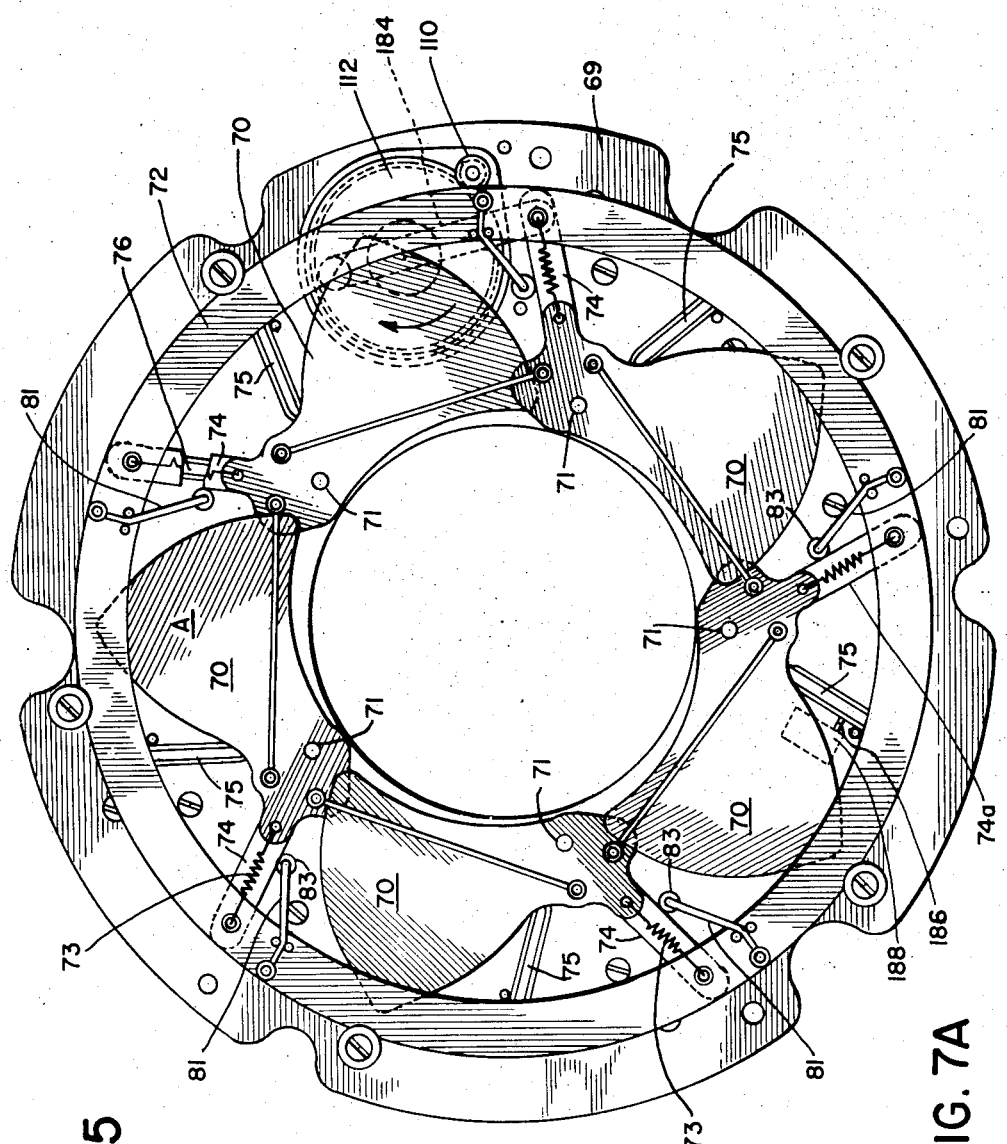

As shown in Fig. 5, an apertured base plate 69, carries leaves 70 pivotally mounted at 71. A ring 72, similar to the previously-described ring 30 for the other set of leaves, is also carried by the base plate 69. For each leaf there is a spring 73, one end of which is attached to the leaf and the other end of which is attached to the ring 72. The points of attachment of springs 73 to the ring 72 are such that when the ring is in its normal position, and when the leaves are in their closed or latched position, the springs apply to the leaves a torque in a direction to urge the leaves toward their open position.

Affixed to each of the leaves, as an extension or crank, is an armature 74, of magnetic material, for example, steel. To cooperate with each of these armatures 74, there are provided in the base plate 69, latching magnetic slots 75, one for each of the leaves, positioned so that the armatures 74 will be opposed to their latching magnetic slots 75, respectively, when the leaf is in its closed position.

There are also provided, in the base plate 69, a set of braking magnetic slots 76, one for each leaf, positioned so that the armatures 74 will be opposed to their respective braking slots when the leaves are in their open position.

Associated with the five latching magnetic slots, there are five electromagnets 78, connected in parallel. Associated with the five braking magnetic slots, there are five electromagnets 80, respectively, connected in parallel. The general arrangement in this respect is similar to that which has been illustrated for the other set of blades in Fig. 3. One of the latching or holding electromagnets 78 is shown in Fig. 1, the other four being omitted in this drawing for clarity. The five braking electromagnets 80 are also omitted in this drawing.

Carried on the ring 72 there is a set of arms 81 of firm but resilient material, such as steel. These arms are affixed to the ring at their outer ends, and carry at their inner ends a small rotatable cylinder 83. When, in a manner to be described, the ring 72 is rotated in a clockwise direction (from the viewpoint of Fig. 5), the ring, acting through the arms 81, causes the cylinders 83 to bear against the armatures 74 of the leaves 70, and thus to rotate the leaves on their pivots 71 clockwise from their open, released position shown in Fig. 5, to their closed, latched position, where they overlap one another and close the aperture. In a manner to be described, power is then applied to the holding magnets for creating magnetic fields in the region of the latching slots 75. The ring 72 then returns to its normal position and thereby applies tension to the springs 73 so as to urge the leaves 70 toward the open position. However, they are, for the present, held in the closed, latched position because the magnetic action of the holding magnets, acting through the slots 75, attracts the armatures 74 firmly against the plate 69. The resulting friction, together with the magnetic force, thereby restrains the leaves 70 from responding to the force of the springs until at a later moment the holding magnets 78 are released.

Reference is now made to Fig. 6 for a description of the circuit for controlling the mechanism for resetting, releasing, and braking, the leaves.

It may be assumed initially that both sets of leaves have been tripped. That is, the front or A set of leaves is in the tripped position, as shown in Fig. 5, where the leaves are open; and the B set of leaves, at the rear, is in the closed, tripped position, as shown in Fig. 2.

In Fig. 6, there is represented one of the holding magnets 78 for the A set of leaves, and one of the braking magnets 80 for the A set of leaves. Also shown is a holding magnet 58 and a braking magnet 60 for the B set of leaves. It will be understood that the other holding magnets 78 for the A set of leaves are connected in parallel with the one shown. Similarly, the magnet 58, the magnet 60 and the magnet 80 each may in turn be considered to represent schematically not just one but a group of parallel-connected magnets.

It will now be further described how all these magnets are energized and de-energized, how the shutter leaves are reset and released, and how these various actions are coordinated.

Resetting

For controlling the reset operation, there is illustrated a reset switch including a manually operable reset lever or button 82 which, by an arrangement to be described, controls a motor 84 and two clutches 86 and 88.

To reset the apparatus, the button 82 is depressed until both sets of leaves have been reset.

The clutches in this illustration are of a spring type. Associated with the clutch 86 there is a pin or dog 90, carried on a rotatable collar 92. For cooperating with the pin 90, there is a projection 94 on an armature 96 which forms part of a clutch relay 98 having a coil 100. The armature 96 is normally spring-biased away from the relay coil 100 so as to bring the projection 94 of the armature into the path of the pin 90. When this condition exists, the projection 94 prevents the collar 92 from rotating, and the clutch is constructed and arranged so that power is not then transmitted from its input shaft 102 to its output shaft 104. The motor 84 is connected through a shaft 106 and reduction gears (not shown) to the shaft 102. The output shaft 104 drives a pinion 110 which in turn drives a gear 112. The gear 112, through a shaft 114, drives an A reset cam 116.

One terminal of the A clutch relay coil 100 is connected to the grounded terminal of a source of D.-C. voltage. This terminal may, in this illustration, be assumed to be the negative terminal. The supply circuit to the other terminal of this coil may be traced from the positive terminal 120 of this voltage source, through a lead 122 to a contact 126 of a relay 128. It may be assumed that this relay is initially in a de-energized condition, because the switch 188 is open. Consequently its armature 129, spring-biased upward, is in engagement with the contact 126. Positive voltage from the terminal 120 is therefore applied from the contact 126 and the armature 129 through a lead 130 to the upper contact 132 of the reset switch. It may therefore be seen that when the reset button 82 is depressed, this positive voltage is applied from the contact 132 through the arm 134 and the lead 136 to the relay coil 100.

The depressing of the reset button 82 also brings its switch arm 138 into engagement with a contact 140. (The button 82 is of insulating material, and hence it does not itself provide an electrical connection between the arm 134 and the arm 138.) Positive voltage from the supply terminal 120 is applied to the switch arm 138, and hence to the contact 140, and from this contact through a lead 142 to the motor 84.

It may thus be seen that the depressing of the reset button 82 energizes both the motor 84 and the clutch relay 98. When this relay is energized, it pulls its armature 96 downward, so as to remove the projection 94 from the position where it can engage the pin 90. This allows the collar 92 to rotate, and shifts the clutch into such a condition that torque is transmitted from the input shaft 102 to the output shaft 104. The reset cam 116 therefore begins to rotate.

Associated with the cam 116 there is a switch having contacts 146 and 148, and an arm 150 spring-biased downwardly, toward the contact 148. Carried by this arm is a projection 152, so positioned that a projection 154 on the cam 116 engages the projection 152 and temporarily lifts the arm 150 when the cam 116 rotates through a predetermined position. It may be assumed that, at the beginning of the operation to be described, the arm 150 is in its lower position, as shown, in engagement with the contact 148.

Power from a positive voltage terminal 156 of the voltage source is supplied through a lead to the arm 150, and, when that arm is in engagement with the contact 148, through a lead 160 to the armature 96. When the relay 98 is energized by the depressing of the button 82, and the armature 96 consequently moves downwardly and engages its associated contact 162, the relay 98 becomes locked in the energized condition, because the power from the terminal 156 continues to be supplied through the arm 150, the lead 160 and the armature 96 to the contact 162, which is connected to the coil 100.

The result is that the power from the motor 84 continues to be transmitted through the clutch 86 to the cam 116 until this cam rotates from its initial position to and through a position where its projection 154 lifts the arm 150 away from engagement with the contact 148, thereby temporarily disconnecting the current supply circuit of the relay 98. This causes the upwardly spring-biased armature 96 to move upward so that its projection 94 engages the pin 90, thereby shifting the clutch 86 to a condition where power is no longer transmitted to the cam 116.

The action of the clutch is such that, after the armature 96 has released and moved upwardly so that its projection 94 is in the path of the pin 90, the effect on the clutch is not instantaneous, but the collar 92 and the pin 90 continue to rotate through an arc until the pin 90 engages the projection 94. Only then is the clutch 86 shifted into a condition in which it no longer transmits power. The ratio of the gears 110 and 112 is such that the above action results in correctly shifting and repositioning the ring 30, as will now be explained.

As shown in Figs. 1 and 5, a link 184 interconnects the gear 112 and the ring 72, this link being pivotally connected at its ends to the ring and to the gear respectively.

It may thus be seen that when the gear 112 is rotated from the position shown in Fig. 5 through 180 degrees, clockwise, it will shift the ring 72 clockwise (from the viewpoint of Fig. 5). The result is that the arms 81 shift the leaves 70, closing the switch 188, at the closed or latched position. At this moment, tension has not yet been applied to the springs. The leaves are held in the latched position by the action of the latching magnetic slots 75, which are now energized at the proper moment in a manner to be described. When the gear 112 is rotated the remaining 180 degrees clockwise, so as to return to its original position, the ring is rotated counterclockwise, and applies tension to the springs 73, which in turn apply counterclockwise torque to the armatures 74 of the leaves 70, which, however, remain latched.

Considering the circuit diagram of Fig. 6 in conjunction with Figs. 1 and 5, it may now be understood that when the reset button 82 is depressed, this actuates the motor 84 and causes the clutch 86 to apply power to the shaft 104, which, acting through the pinion 110, drives the gear 112 through 360 degrees, until the cam 116 and its projection 154, with associated circuits, cause the clutch 86 to stop this motion of the shaft 104 and the gears 110 and 112. It is further understood that this action, initiated by the depressing of the button 82, causes the gear 112, acting through the link 184, to shift the ring 72 first clockwise so as to latch the leaves in the closed position and then counterclockwise so as to apply an opening force to them. It will now be explained how the latching magnetic slots 75 are energized at the proper time so as to hold the leaves in the latched position.

When the leaves reach the latched position, one of the armatures 74a (shown near the bottom of Fig. 5) engages a pin 186 of the switch 188. This closes this switch, the position of which in the circuit may be seen in Fig. 6 to be in series with the energizing circuit for the hold magnets 78. This energizing circuit may be traced from a positive current supply terminal 190 through a lead 192, an arm 194 (spring-biased upwardly) of a trip switch 200, a contact 196, a lead 198, and the switch 188, to the coils 78 of the hold magnets of the latching slots 75. Hence when the leaves reach the latched position they close, and hold closed, the switch 188 which energizes the latching slots. These energized latching slots in turn hold the leaves in this position.

It may be noted that when the switch 188 is closed, energizing the hold coils 78, this action also energizes the relay 128 through a lead 201. This pulls the armature 129 down, thereby breaking the circuit from the positive terminal 120 through the contact 126 to the lead 130. The result is that while the A leaves are latched, depressing of the button 82 cannot now re-energize the relay 98 and cause the clutch 86 to transmit power to the A reset cam. This action cannot recur as long as the A leaves are in the latched position.

*Resetting the B set of leaves*

After the cam 116 has turned 360 degrees in response to the depressing of the reset button 82, its projection 154, in lifting the arm 150, causes this arm to engage the contact 146. There is thereby completed a circuit from the current supply terminal 156 to the contact 146, and thence through a lead 210 to a clutch relay 212 which serves to control the clutch 88 for the B set of leaves in much the same manner as the relay 98 controls the clutch 92 for the A set of leaves. When the coil 214 of the clutch relay 212 is energized, it attracts downwardly its armature 216, which is spring-biased upwardly. This has two effects. It shifts the clutch 88 to a power-transmitting condition, thereby causing its associated cam 240 to rotate. It also has the effect of locking in a power supply circuit for the relay 212. This circuit may be traced from a positive terminal 218 through a downwardly biased switch arm 220, a contact 222 opposed to this switch arm, a lead 224, the armature 216, and a contact 226, which is connected to one end of the coil 214. The other end of this coil is grounded. Thus the relay 212, once energized, remains energized until the arm 220 is lifted away from the contact 222, by means to be described.

The power-transmitting action of the clutch 88, when the armature 216 is pulled downwardly, is similar to that of the clutch 86. Power from the motor is transmitted from the shaft 106 to an input shaft 228 of the clutch 88. The clutch, when actuated as described, drives its output shaft 230, which in turn causes rotation of the gears 45 and 44. The gear 44 rotates a shaft 232, which carries a cam 240 having a projection 242. This projection 242 cooperates with a projection 244 on the arm 220 in a manner similar to that described in connecton with the operation of the cam 116, so as to cause rotation of the gear 44 through 360 degrees. When this rotation has occurred, the projection 242 engages the projection 244 and lifts the arm 220, thereby causing it to disengage the contact 222. This opens the current supply circuit of the relay 212, de-energizing this relay. When deenergized, this relay allows its armature to move upward, thereby causing the clutch 88 no longer to transmit power to its output shaft, when its pin engages the associated projection on the armature 216, thus stopping rotation of the gear 44.

The first 180 degrees of rotation of the gear 44, by the action of the link 40, the ring 30, and the arms 52 already described, shifts the leaves 14 to their open or latched position.

When the leaves reach the latched position, their armatures 46 will lie over their latching magnetic slots. For energizing these slots, one of the armatures, 46a, engages the pin 246 of a switch 248, which is mounted adjacent the end of the path of this armature, as shown in Figs. 2 and 4. As shown in Fig. 6, this completes an energizing circuit for the holding magnets 58 from the current supply terminal 190, the lead 192, a lead 250, an arm 252 (biased upwardly) and a contact 254 of a switch 253, a lead 256, and the switch 248 to one end of the magnet 58, the other end of which is grounded. In this way, the motion of the leaves to the latched position energizes the latching slots, which retain them in that position.

Rotation of the gear 44 through the remaining 180 degrees causes the ring 30 to shift back to its normal position and apply torque to the leaves 14 in a closing direction, as has already been described.

The resetting or latching of both sets of leaves has now been completed. The button 82 is now released, and this de-energizes the motor 84.

*Releasing the leaves*

In the arrangement shown in Fig. 6, the switch 200 is used for tripping the A set of leaves, so as to open the aperture, and the switch 253 is used for tripping the B set of leaves, so as to close the aperture. These separate, manually operable switches are shown in this figure for simplicity of illustration, but a variety of arrangements may be used for automatically tripping the B leaves a pre-set time after the A leaves are tripped. This will be referred to again at a later point.

In Fig. 6, the trip switch 200 for the A leaves includes a manually operable button 258, a switch arm 260, and a contact 262 opposed to the arm 260. The switch is of the make-before-break type, in that when the button 258 is depressed, the arm 260 first engages the contact 262, carried by the arm 194, and the contact 262 thereafter forces the arm 194 away from its contact 196. The arm 260 is spring-biased upwardly, away from its contact 262. The arm 194 is also spring biased upwardly, toward its contact 196.

To trip the A set of leaves, the operator depresses the button 258. The first effect of this is to energize the brake magnets for both sets of leaves. The energizing circuit may be traced from the positive terminal 190 through the lead 192, the switch arm 194, the contact 262, the arm 260, and a lead 264 to the brake magnets for the A leaves, these magnets being represented in Fig. 6 schematically by the electromagnet coil 80. It is understood, as previously stated, that the other brake magnets for the A leaves are connected in parallel with the magnet 80 shown in Fig. 6. Likewise, the other brake magnets for the B leaves are contacted in parallel with the magnet 60 shown in Fig. 6.

The same energizing circuit which energizes the A brake magnets 80 also energizes the B brake magnets 60, when the button 258 is depressed, as may be seen in Fig. 6, all these magnets being here illustrated as connected in parallel.

After the first portion of the downward movement of the button 258 has energized all the brake magnets, the further downward movement of the button forces the arm 194 away from the contact 196. This breaks the energizing circuit for the hold magnets 78, thereby de-energizing the latching slots for the A leaves. These leaves, now released, respond to their springs 83, and rapidly move from their closed, latched position toward their open, released position, shown in Fig. 5. When their armatures 74 approach their braking slots 76, which are now energized, these slots brake the leaves, as desired. The aperture of the camera is now open.

A moment later, when the aperture is to be closed, the trip switch 253 for the B set of leaves is operated. This switch includes a control button 266, a switch arm 268 which carries this button, and a contact 270 opposed to this arm. When the button 266 is depressed, it first causes the arm 268 to engage the contact 270. This completes an energizing circuit for all the brake coils 60 and 80 which may be traced from the positive terminal 190, through the lead 192, the lead 250, the arm 252, the contact 270, the arm 268, and the lead 264 to these coils. Further downward movement of the switch 253, which is of the make-before-break type, now breaks the energizing circuit for the hold magnets 58 by forcing the arm 252 out of engagement with its contact 254. This now de-energizes the latching slots for the B set of leaves, and causes them to be rapidly moved by their springs from their open, latched position, shown in Fig. 4, to their closed, released position, shown in Fig. 2.

This closes the aperture of the camera and completes the operation.

Note that as long as the leaves are in their released positions, neither set of hold coils can be energized, because the switches 188 and 248 are open.

Because the hold coils remain de-energized until the leaves reach the latched position, the power required for the resetting operation is less than if this were not the case. Otherwise, near the end of the resetting operation, the motion of the armatures and leaves would be impeded by the action of the latching slots and the resulting friction between the armatures and the base plate.

Figure 7

As previously stated, a variety of arrangements may be used for automatically tripping the B leaves a pre-set time after the A leaves are tripped, and for making certain that, before the hold coils for a set of leaves are de-energized so as to trip the leaves, the brake coils for these leaves are first energized.

For this purpose, as shown in Fig. 7, there is provided a voltage source having a grounded terminal and a positive terminal 280. This terminal 280 is connected to an arm 282 of a make-before-break type of switch which also includes an arm 284 and a contact 286. The arm 282 is normally spring-biased upwardly, where it engages the contact 286. Near its end, the arm 282 bears a contact 288. The arm 284 is also spring-biased upwardly, so that it does not normally engage the contact 288.

The hold coils for the A leaves are connected to the arm 286 through a lead 290. The brake coils for both the A and B sets of leaves, in parallel, are connected to the arm 284 through a lead 292. It may be assumed that initially both sets of leaves are in the latched position. The hold coils for the A leaves are energized through a circuit which may be traced from the positive voltage terminal 280, the lead from this terminal to the arm 282, which is now engaging the contact 286, and thence the lead 290 to the hold coils for the A leaves.

The hold coils 60 for the B leaves are controlled through lead 294 and a timer or time delay circuit 296. This circuit is illustrated as having three input leads, including a grounded lead 298, a lead 300 connected to the positive voltage terminal 280, and a control input lead 302, which is connected to a contact 286.

When, initially, the leaves are in their latched position, the control input lead 302 receives a positive voltage from the source 280, through the arm 282, and the contact 286. The timer is adapted, under this condition, to apply a positive voltage through the lead 294 to the hold coils 60.

When the leaves are to be tripped, the arm 284 is depressed by its control button, thereby first energizing the brake coils by a circuit from the terminal 280, the arm 282, its contact 288, the arm 284 and the lead 292.

As the arm 284 is manually depressed still farther, it causes the arm 282 to disengage the arm 286, thereby breaking the energizing circuit for the A hold coils. This action simultaneously disconnects the control lead 302 from the positive voltage terminal 280. The operation of the timer is such that, during a pre-set time interval after the positive voltage supply is thus disconnected from the lead 302, the voltage on the lead 294 continues to be positive, so as to maintain the hold coils 60 energized, but at the end of this interval, the lead 294 is, in effect, switched from a positive voltage toward approximately ground voltage, thereby de-energizing the hold coils 60.

It may be seen that with this type operation, first all the brake coils are energized, then the A hold coils are de-energized to release the A set of leaves, thereby initiating the exposure, and then, a pre-set time interval thereafter, the B hold coils are de-energized to release the B set of leaves, thereby terminating the exposure after the desired interval.

A wide variety of timers or time delay circuits which are, per se, well known, may be used in the circuit as described. They may, for example, be of the electronic, electromagnetic, or electromechanical type.

Thus in one electronic timer, a controlled time delay may be obtained by the use of a condenser-resistance charging or discharging circuit in which the value of the resistance is adjustable.

For example, there may be provided a condenser which is normally in a charged condition when the lead 302 is at a positive voltage. When this lead 302 is disconnected from its positive supply terminal as has been described, this condenser may discharge through a path including a variable resistance. The voltage across the condenser may be applied through a power amplifier to control the energizing and de-energizing of the coils 60.

Figure 7A:
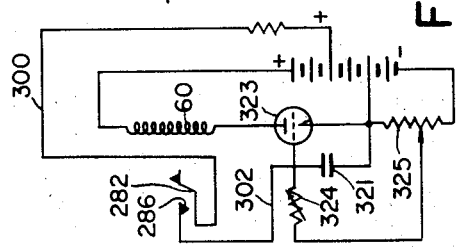
Figure 7A is a schematic circuit diagram of one form of the timer shown in block diagram form in Figure 7.

Thus, as shown in Figure 7A, initially, when the contact 286 is engaging the arm 282, the condenser 321 is in a positively charged condition, because the lead 302 is then connected to a positive voltage through the lead 300, as shown. Under this condition, the grid of the power amplifier tube 323 is sufficiently positive that the tube conducts current strongly and the hold coil 60 is energized. When, however, the arm 282 disengages the contact 286, the lead 302 is disconnected from the lead 300 and hence from its positive voltage, and the result is that the condenser 321 may gradually discharge through a path including variable resistance devices 324 and 325, and the voltage condition on the upper plate of the condenser, and hence on the grid of the tube, changes from its previous positive value to a negative voltage, available from the resistor device 325. The result of this gradual change in voltage is that after the desired time delay, the current through the tube 323 is cut off, deenergizing the coil 60.

To provide a fast switching action, the power amplifier may include regenerative feedback; for example, it may be of the bi-stable or flip-flop type.

The time delay may, as another illustration, be obtained by the use of a slow-release or slow-pickup relay.

Figure 15:
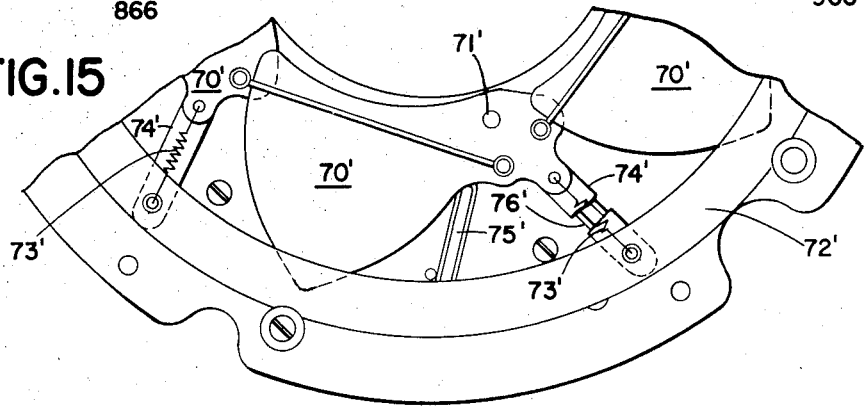
Figure 15 is a view of a portion of a single leaf system, as seen from the same viewpoint as the system shown in Figure 5.

In Figures 8 through 14 of the drawings, elements corresponding generally to elements of the type shown in earlier figures, or modifications thereof, are designated by reference numerals ending in similar digits. (For example, pivot 320 in Figure 8 corresponds generally to pivot 20 in earlier figures, etc.). In Figure 15, elements corresponding generally to elements of Figure 5 are designated by like numbers, primed (for example, 72' versus 72).

Figure 8:
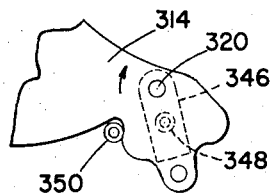
Figures 8 through 12 are fragmentary, partially diagrammatic views of representative leaves, as seen from the same viewpoint as that of Figure 4, together with associated components constructed in accordance with various other illustrative embodiments of the invention.
Figure 9:
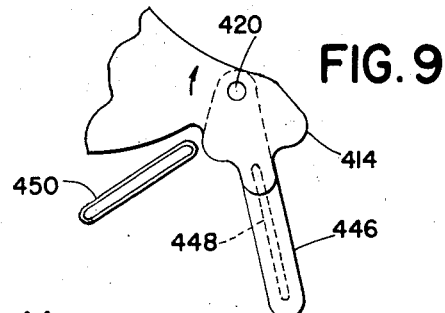

Although, in Figures 2 through 5 of the drawings, the armature portions 46 and 74 of the leaves are illustrated as in the form of an arm extending outwardly from the leaves, the term "armature" is herein to be understood as not restricted to such an arrangement. Rather, it can lie underneath or be a part of the main portion of the leaf immediately adjacent that part which controls the aperture, or any portion thereof which remains outside the aperture. For example, as shown in Figure 8, an armature 346 is mounted directly beneath a portion of the lead 314, and, in the reset position of the leaf (the position shown), is disposed immediately above a latching magnet 348. A braking magnet 350 is spaced from the magnet 348 and is adapted to act on the armature 346 as the leaf approaches its tripped position upon clockwise rotation about the pivot 320. In some embodiments, such as that shown in Figure 8, there are advantages in positioning the armature 346 relatively close to the pivot 320 of the leaf so as to minimize inertia.

As will be understood from the general description of the entire apparatus, the shutter system of the present application has the advantage of low inertia, which contributes to the advantages of rapid and substantially shockless acceleration and deceleration.

To make certain that the braking force is sufficient to stop the motion of the armatures and leaves at the desired released position, without an undesired amount of overshoot, the magnitude of the magnetic field of the braking magnetic slots is adjusted to the required value by adjusting the current through the braking coils. This may be done, for example, by a rheostat or variable resistance in the power supply to these coils.

Although the primary braking action is provided by the braking magnetic slots, the apparatus also provides a supplementary braking action, through the action of the arm 52, as seen in Fig. 2. Thus, if the leaves and their associated armatures have any residual tendency to overshoot the desired released position, after the action of the braking magnetic slots, the armatures 46 come up against the cylinders 57 carried at the ends of the firm but resilient arms 52, and their further motion is thereby checked.

In addition to being available to provide, if necessary, this supplementary braking action in combination with the braking action of the braking magnetic slots, these arms 52 are also available to provide fail-safe braking action in the event there is a power loss which prevents the braking slots and perhaps also the latching slots from performing their normal functions.

A feature of one form of the invention is that each braking magnetic slot and its armature are so interrelated in their position and shape that as the armature moves into the magnetic field provided by the slot, the decelerating force is applied in accordance with a predetermined pattern, and through an angle of movement of the armature which may extend as far as needed. For example, if the longitudinal axis of each armature passes through the pivot of its leaf, the associated braking slot, instead of having its axis pass through that pivot, may be turned at an angle to such a position, as shown by the braking slot 450 in Figure 9, so that first one end of the armature enters the magnetic field of the braking slot, near one end of the slot, and then, as the motion continues, there is a larger and larger overlapping area of the armature and the slot. Thus the overlap may begin at one end of the slot and increase until the entire slot is overlapped. This has the effect of enlarging the angle through which the braking force is applied. One advantage of this arrangement is that it aids in preventing any tendency for the leaves and armatures to overshoot the desired released position.

A characteristic of this and a number of other embodiments is that the overlapping area increases as a nonlinear function of the distance moved by the armature.

Figure 10:
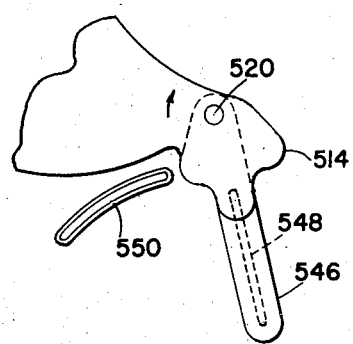
Figure 11:
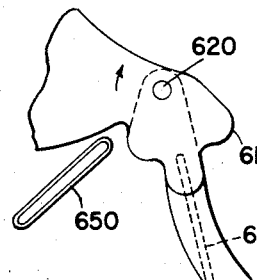
Figure 12:
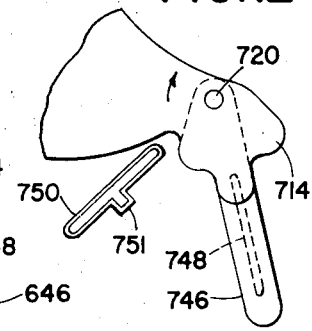
Figure 13:
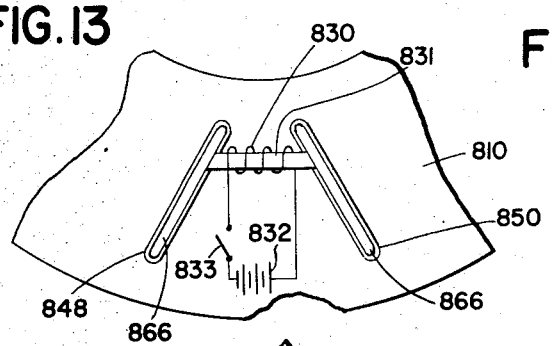
Figures 13 and 14 are fragmentary, partially diagrammatic views of certain alternative magnetic means in accordance with the invention, as seen from the same viewpoint as that of Figure 3.
Figure 14:
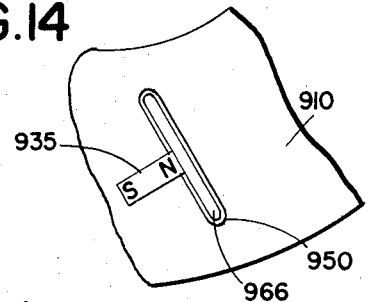

As another example of an arrangement for providing the braking action through an extended angle, the slot, instead of being essentially straight, may be curved, as shown by the braking slot 550 in Figure 10, and used, in combination with a straight armature.

Likewise, a straight slot, such as the braking slot 650 (Figure 11), may be used in combination with an armature 646 which is curved, or otherwise shaped so that first a relatively small portion and then an increasingly large portion of the armature overlaps the slot as the armature approaches the latched position.

Still other examples for the same purpose include an extension 751 (Figure 12) on the slot 750 and its pole face, extending toward the armature (or an extension on the armature toward the slot), for providing a decelerating force which is initially smaller than its later value.

In the embodiment shown in the drawings, it will be observed that each latching slot and each braking slot is controlled by its own individual coil. In an alternative arrangement, the latching slot and the holding slot for a given leaf may be controlled by a single coil, such as the coil 830 shown in Figure 13. Thus the magnetic path would be from the base plate 810, across the air gap in the braking slot 850 to the pole piece 866 therein, through the pole piece extending through the single coil 830, and thence from the pole piece 866 in the latching slot 848, through the air gap in the latching slot, to the base plate 810 and back to the point of origin. This arrangement permits the reduction of the number of coils to one-half those which have been described above. In the operation of such an arrangement, the control coils are energized, by passing a normally constant current through them from a voltage source, such as a battery 832, so as to provide the latching force, when the leaves are in the latched position. For releasing the leaves, the normally constant current through the coils 830 is momentarily interrupted and then restored to its previous value. The interruption may be achieved by temporarily breaking the circuit, such as by opening and then closing a contact 833, or, instead, a negative voltage pulse may be superimposed (in a bucking sense) upon the normal voltage which supplies the current to the coils, so as temporarily to reduce that voltage to a net value low enough so that the magnetic field is temporarily too weak to hold the leaves against the torque applied by the springs. Once released, the leaves are moved by the springs away from the latched position and toward the released position. The voltage and current, and the magnetic field in the magnetic path including both the braking slot and the latching slot, are restored after the armature has left the region of the latching slot and before it has reached the region of the braking slot. The braking slot then produces its braking action when the armature reaches its zone of influence.

It will be noted that in the system shown in Figures 1 through 7A of the drawings, both the latching magnet and the braking magnet are, at various stages of the operation, energized and deenergized. In an alternative arrangement, the braking magnet may be arranged to produce a steady magnetic field all the time. As an illustration, the braking magnets may each comprise a permanent magnet, such as the permanent magnet 935 shown in Figure 14, and may not require the use of a coil. In this connection, however, it will be pointed out that one advantage of the system shown in Figures 1 through 7A is that, because the braking electromagnets are de-energized prior to the resetting operation, the resetting of the leaves does not require motion of the armatures against the magnetic and friction effects produced by the braking electromagnets.

It will be understood that the principles of the invention are applicable to systems using a different number of leaves than those illustrated in the drawings, or, in some cases, to a system using only one leaf.

Although in the system as described heretofore there are provided a pair of sets of leaves, the invention may also be applied to a shutter including only one set, such as that shown in Figure 15. The single set system of Figure 15 is of the general type shown in Fig. 5, but the ring 72' in Figure 15 is adapted for shifting movement through a greater arc. When latched, the leaves 70' are closed. The slots 75' now provide the latching force. Initially the springs apply a force in a direction to urge the leaves toward the open position. When the slots 75' are de-energized, the leaves fly open to the position shown in Figure 15, and a braking force is applied by the slots 76'. In one form of the invention, once the leaves reach the open position, the ring 72' is shifted clockwise far enough to reverse the direction of the force of the springs. The slots 76' remain energized as long as it is desired that the leaves remain open. Note that these slots, which provided the braking action in the first part of the operation of the system, are now providing the latching action. When the aperture is to be closed, these slots 76' are de-energized, and the slots 75' are energized, and the leaves now fly shut and are braked by the action of the slots 75'.

In conclusion, it will be observed that there has been described and illustrated a photographic shutter system including a highly novel leaf assembly mechanism, having very low inertia and fast response. There are provided individual springs for the respective leaves, magnetic latching and braking of the leaves, and a novel system for controlling the resetting, latching, releasing and braking of the two sets of leaves. An important advantage is that in operation the apparatus substantially is shockfree. Power is applied directly to the leaves, and also the braking force is applied directly to the armature portion of the leaves, with complete elimination of backlash. The design is in great contrast to previous designs in which the application of power and the application of braking force is through a train of linkages which cause lost motion, elastic and out-of-phase operation of the members, and resulting shocks.

The magnetic braking of the proposed system, as stated, applies the braking force directly, instead of indirectly, to the leaves. Furthermore, this force may be applied in a controlled pattern, so that the effect may be as gradual or as stiff as desired. Stil further, it produces high frictional damping, eliminating the tendency of the rapidly moving parts to bounce, when they reach the released position. With this type braking, these advantages are attained even though the braking action begins much later in the cycle than the point at which mechanical braking has heretofore normally begun. This contributes to the higher speed of operation of the leaves which can be obtained.

One of the numerous disadvantages existing in many previous systems, which release the leaves mechanically under the control of a solenoid when that solenoid is energized, is that a change of the supply voltage changes the speed of operation. With the present system, however, so long as the supply voltage remains great enough to hold the leaves in the latched position, the speed of release is substantially independent of variations in the supply voltage. This is an important significant advantage.

In contrast to previous shutters which depend upon mechanical action in the release and braking of the leaf system, the system which has been described herein, depending upon magnetic action instead of mechanical action, does not require close tolerances. It can readily use interchangeable parts and is easy to assemble by unskilled personnel without adjustment. The apparatus is also less expensive, and has greater reliability, longer life and superior performance than previous shutters.

While an illustrated form of the invention has been disclosed in considerable detail, it will be understood that various changes may be made in the construction and arrangement without departing from the general principles and scope of the invention as defined by the appended claims.

What is claimed is:

1. In a photographic shutter, in combination, a plurality of leaves movable to an open position and to a closed position, each of said leaves comprising a magnetic portion, means biasing said leaves from a first of said positions toward a second of said positions, a plurality of magnetic latching means, individual to each of said leaves, for holding said leaves in latched position with the aid of magnetic fields, means for substantially simultaneously removing the effect of said magnetic latching means to release said leaves from said first position, and magnetic braking means individual to each of said leaves, for braking them with the aid of magnetic fields as they approach their second position.

2. In a photographic shutter, in combination, an apertured base plate of magnetic material, a plurality of shutter leaves pivotally mounted on said plate and having a first position and a second position, said leaves being adapted to close the aperture in said plate when in one of said positions and to open it when in the other of said positions, each of said leaves comprising a magnetic portion, said plate having two sets of slots, a latching slot for each of said leaves at a position opposed to said magnetic portion of said leaf when in one of said positions and a braking slot opposed to said portion when said leaf is in the other of said positions, electromagnetic means associated with said slots and including a pole piece in said slot spaced from said plate, and a set of springs, one for each of said leaves, for applying torque directly to said leaves to urge them from one of said positions to the other, one set of said slots together with its magnetic means serving to latch said leaves in one of said positions, the other set of said slots serving to apply directly to each of said leaves a braking action by pulling said leaf against said base plate as its magnetic portion approaches its associated braking slot, whereby said apparatus provides substantially shockless operation.

3. In a photographic shutter system, in combination, a support, a plurality of shutter leaves pivotally mounted on said support and movable to an open position and to a closed position, a set of springs, one for each of said leaves, for applying torque directly to said leaves to urge them from one of said positions to the other, each of said leaves including an armature portion, latching electromagnetic means individual to each of said leaves including a plurality of latching pole faces, one for each of said armatures, means for shifting said leaves to a latched position, said pole faces being opposed to said armatures when said leaves are in said latched position, means for energizing said electromagnetic means to draw said armature portions toward said support and thereby hold said leaves in their latched position, and means for simultaneously de-energizing the electromagnetic means for each of said leaves for tripping said leaves.

4. Apparatus as in claim 3, in which each said leaf is individually prestressed by its spring away from its latched position so that when released by its latching pole face it begins forward movement without backlash.

5. Apparatus as in claim 3, including electromagnetic means including a plurality of braking pole faces, one for each of said armatures, respectively located opposite the positions assumed by said armatures when said leaves are in their tripped position, and means for energizing said braking electromagnetic means prior to de-energizing said latching electromagnetic means.

6. In a photographic shutter system, in combination, a support, a plurality of shutter leaves pivotally mounted on said support and movable to an open position and to a closed position, a set of springs, one for each of said leaves, for applying torque directly to said leaves to urge them from one of said positions to the other, each of said leaves including an armature portion, latching electromagnetic means individual to each of said leaves including a plurality of latching pole faces, one for each of said armatures, means for shifting said leaves to a latched position, said pole faces being opposed to said armatures when said leaves are in said latched position, means for energizing said electromagnetic means to draw said armature portions toward said support and thereby hold said leaves in their latched position, means for simultaneously de-energizing the electromagnetic means for each of said leaves for tripping said leaves and a set of links equal in number to the number of leaves, interconnecting said leaves, for aiding in controlling their position.

7. Apparatus as in claim 6 in which the only parts of said apparatus which move during the time when said leaves are moving to control the exposure are said leaves, including their armature portions, said springs, and said links.

8. In a photographic shutter system including a first and a second set of leaves, in combination, first latching means including a first set of electromagnets for latching said first set of leaves, second latching means including a second set of electromagnets for latching said second set of leaves, means biasing said leaves toward a tripped position, means for de-energizing said first set of electromagnets for tripping said first set of leaves, and means for thereafter de-energizing said second set of electromagnets for tripping said second set of leaves, each of said latching means remaining stationary during the tripping of said first and second sets of leaves.

9. In a photographic shutter system, in combination, a first and a second set of leaves, means biasing said first set toward an open position, means biasing said second set toward a closed position, means for moving said sets of leaves toward their respective latched positions, each of said leaves having an armature portion, and latching electromagnetic means having a plurality of pole faces, one for each said armature, positioned to be opposed to said respective armatures when in the latched position, for holding them and their leaves latched so long as said electromagnetic means is energized, means for de-energizing the said electromagnetic means for said first set of leaves to permit movement of said first set toward said open position, and means for de-energizing said electromagnetic means for said second set of leaves to permit movement of said second set toward said closed position, said latching means remaining stationary during said movement of said first and second sets of leaves.

10. A photographic shutter system including a first and a second set of leaves, in combination, a first set of electromagnets for latching said first set of leaves, a second set of electromagnets for latching said second set of leaves, a third set of electromagnets for braking said first set of leaves and a fourth set of electromagnets for braking said second set of leaves, means for energizing said third and fourth sets of electromagnets to create areas of magnetic flux, means for thereafter de-energizing said first set of magnets to trip said first set of leaves, and means for de-energizing said second set of magnets thereafter, for tripping said second set of leaves, said first and second sets of leaves being adapted to pass into respective areas of magnetic flux upon the tripping thereof to thereby brake said leaves.

11. In a photographic shutter system, in combination, a first and a second set of leaves movable to open and closed positions, spring means individual to said respective leaves in said first set biasing them toward an open position, spring means individual to said respective leaves in said second set biasing them toward a closed position, a plurality of electromagnetic latching means individual to said leaves, for holding said leaves in their latched positions, a plurality of electromagnetic braking means individual to said leaves for creating an area of magnetic flux adapted to exert a force upon each of said leaves for braking them as they approach their released positions, a plurality of springs, one for each of said leaves, for applying torque directly to said leaves individually to urge them from their latched to their released positions, means for resetting said leaves from their released to their latched positions, and switching means positioned and connected to energize said magnetic latching means when said leaves reach their latched positions.

12. In a photographic shutter, in combination, an apertured plate, a plurality of shutter leaves pivotally mounted on said plate and having a latched position and a released position, said leaves being adapted to close the aperture in said plate when in one of said positions, and to open it when in the other of said positions, each of said leaves including an armature portion, electromagnetic latching means including a plurality of latching pole faces, one for each of said leaves, at positions opposed to said armatures when said leaves are in their latched positions, electromagnetic braking means including a plurality of braking pole faces, one for each of said leaves, opposed to said armatures when said leaves are in said released position, a plurality of springs, one for each of said leaves, urging them from their latched to their released positions, means including a ring rotatable through an arc and arms carried by said ring for shifting said leaves from their released to their latched position, one end of each of said springs being connected to a point on its said leaf, and the other end being connected to a point on said ring, means for energizing said latching pole faces for holding said leaves in said latched position, and means for later de-energizing each of said latching pole faces simultaneously for releasing said leaves.

13. In a photographic shutter system, in combination, a set of leaves movable to latched and released positions, spring means individual to said respective leaves biasing them toward their released positions, a plurality of electromagnetic latching means individual to said respective leaves for holding them in their latched positions, a plurality of electromagnetic braking means individual to said leaves for braking them as they approach their released positions, a plurality of springs, one for each of said leaves for applying torque directly to said leaves individually to urge them from their latched to their released positions, means for resetting said leaves from their released to their latched positions, means for de-energizing said electromagnetic latching means to release said leaves, and yieldable means positioned to engage a a portion of said leaves at a point just past their released positions, for supplying braking action supplementary to that of said electromagnetic braking means.

14. In a photographic shutter system, in combination, a support, a plurality of shutter leaves pivotally mounted on said support and movable to latched and tripped positions, a set of springs, one for each of said leaves, for applying torque directly to said leaves to urge them from one of said positions to the other, each of said leaves including an armature portion, latching electromagnetic means including a plurality of latching pole faces, one for each of said armatures, means for shifting said leaves to their latched positions, said pole faces being opposed to said armatures when said leaves are in said latched positions, means for energizing said electromagnetic means to hold said leaves in their latched positions, means for de-energizing said electromagnetic means for tripping said leaves, electromagnetic means including a plurality of braking pole faces, one for each of said armatures, respectively located opposite the positions assumed by said armatures when said leaves are in their tripped positions, said braking pole faces and said armatures being so shaped in relation to each other that, as said leaves approach said tripped positions, first a small portion and then an increasingly large portion of each of said armatures overlaps its said braking pole face, said overlapping area increasing as a non-linear function of the distance moved by said armatures, whereby said braking action is applied in a desired pattern through an extended arc.

15. In a photographic shutter system, a set of movable leaves, said leaves including armature portions, latching means including a first set of electromagnets for latching said leaves in latched position, springs individual to said leaves biasing them toward a tripped position, braking means including a second set of electromagnets for braking said leaves, and means for de-energizing said first set of electromagnets for tripping said leaves and for energizing said second set for braking said leaves, whereby when said leaves are moving from their latched position to their tripped position, the only parts which move are said leaves, including their armature portions, and said springs.

16. In a photographic shutter system, in combination, a support, a plurality of leaves pivotally mounted on said support and movable to an open position and to a closed position, each of said leaves including a magnetic armature portion, means biasing said leaves from a first of said positions to a second of said positions, magnetic latching means, individual to said leaves, adapted when actuated to hold said leaves in latched position by pulling their said armature portions against said support, means for substantially simultaneously removing the effect of said magnetic latching means to release said leaves, and magnetic braking means individual to said leaves for braking them as they approach their released positions by pulling said armature portions against said support.

17. In a photographic shutter system, in combination, a support, at least one leaf mounted on said support and movable to an open position and to a closed position, said leaf including a magnetic armature portion, first magnetic means opposed to said armature when said leaf is in its closed position and adapted when energized to pull said armature against said support, second magnetic means opposed to said armature when said leaf is in its open position and adapted when energized to pull said armature against said support, means for urging said leaf from its closed to its open position and for subsequently urging said leaf from its open to its closed position, and switching means for energizing and de-energizing said first and second magnetic means, for causing said first magnetic means to serve as latching means and said second magnetic means to serve as braking means for said leaf during the opening of said leaf and for causing said second magnetic means to serve as latching means and said first magnetic means to serve as braking means for said leaf during the closing of said leaf.

18. In a photographic shutter system, in combination, a set of leaves movable to a latched position and to a tripped position, each of said leaves including an armature portion, means biasing said leaves toward their tripped position, electromagnetic means for latching and braking said leaves, said electromagnetic means including a set of latching pole faces, one for each of said armature portions, opposed thereto when said leaves are in their latched position, a set of braking pole faces, one for each of said armature portions, opposed thereto when said leaves are in their tripped position, and means for energizing and de-energizing said pole faces to create areas of magnetic flux acting upon said armature portions when said portions are opposed to their respective pole faces, said last-mentioned means including a plurality of coils, one for each of said armature portions, each of said coils being connected to control the latching pole face and the braking pole face for its said armature portion.

19. In a photographic shutter system, in combination, a set of leaves movable to a latched position and to a tripped position, each of said leaves including an armature portion, means biasing said leaves toward their tripped position, and electromagnetic means for latching and braking said leaves, said electromagnetic means including a set of latching pole faces, one for each of said armature portions, opposed thereto when said leaves are in their latched position, a set of braking pole faces, one for each of said armature portions, opposed thereto when said leaves are in their tripped position, and means for energizing and de-energizing said pole faces, whereby an area of magnetic flux is created adjacent each of said pole faces for restricting movement of said leaves when said armature portions are opposed to their respective pole faces.

References Cited in the file of this patent

UNITED STATES PATENTS

| 1,274,262 | Gruss | July 30, 1918 |
| 2,463,206 | Robertson | Mar. 1, 1949 |
| 2,663,235 | Fuerst | Dec. 23, 1953 |
| 2,803,181 | Willcox | Aug. 20, 1957 |

UNITED STATES PATENT OFFICE

CERTIFICATION OF CORRECTION

Patent No. 2,953,983                                  September 27, 1960

Alfred F. Larson

It is hereby certified that error appears in the above numbered patent requiring correction and that the said Letters Patent should read as corrected below.

Column 6, lines 6 and 7, for "applicables" read -- applicable --; line 20, for "partiles" read -- particles --; column 13, line 67, for "arm" read -- arms --; column 14, line 55, after "pole piece" insert -- 831 --; column 18, line 74, after "engage" strike out -- a --.

Signed and sealed this 2nd day of May 1961.

(SEAL)
Attest:

ERNEST W. SWIDER                                              DAVID L. LADD
Attesting Officer                                              Commissioner of Patents